US008991784B2

(12) United States Patent
Jürgens et al.

(10) Patent No.: US 8,991,784 B2
(45) Date of Patent: Mar. 31, 2015

(54) VALVE, PARTICULARLY GLUE VALVE

(75) Inventors: Eric Jürgens, Berlin (DE); Reinhard Hoppe, Tespe (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 94 days.

(21) Appl. No.: 13/264,301

(22) PCT Filed: Apr. 13, 2010

(86) PCT No.: PCT/EP2010/002253
§ 371 (c)(1),
(2), (4) Date: Oct. 13, 2011

(87) PCT Pub. No.: WO2010/136096
PCT Pub. Date: Dec. 2, 2010

(65) Prior Publication Data
US 2012/0037823 A1    Feb. 16, 2012

(30) Foreign Application Priority Data
May 25, 2009   (DE) .......................... 10 2009 022 496

(51) Int. Cl.
*F16K 31/06*      (2006.01)
*B05C 5/02*       (2006.01)
*F16K 27/02*      (2006.01)

(52) U.S. Cl.
CPC ............... *B05C 5/0225* (2013.01); *F16K 31/06* (2013.01); *F16K 27/029* (2013.01)
USPC .................. 251/129.21; 222/504; 137/315.03

(58) Field of Classification Search
CPC ................................. F16K 27/029; F16K 31/06
USPC ............. 251/129.15, 129.21; 222/146.5, 504; 137/15.18, 315.03
See application file for complete search history.

(56) References Cited

U.S. PATENT DOCUMENTS

| | | | | |
|---|---|---|---|---|
| 2,096,763 | A * | 10/1937 | Ray et al. .................. | 251/129.15 |
| 3,811,601 | A * | 5/1974 | Reighard et al. ............. | 222/504 |
| 3,861,644 | A * | 1/1975 | Knape ....................... | 251/129.21 |
| 4,962,871 | A | 10/1990 | Reeves | |
| 5,083,747 | A * | 1/1992 | Schmitt-Matzen ...... | 251/129.21 |
| 5,791,531 | A * | 8/1998 | Hassler, Jr. ................... | 222/504 |
| 5,875,922 | A * | 3/1999 | Chastine et al. ............. | 222/504 |
| 6,170,766 | B1 * | 1/2001 | Focke et al. .............. | 251/129.15 |

(Continued)

FOREIGN PATENT DOCUMENTS

| | | |
|---|---|---|
| CN | 101171187 A | 4/2008 |
| DE | 3841474 A1 | 6/1990 |

(Continued)

OTHER PUBLICATIONS

State Intellectual Property Office of the People'S Republic of China, Notificatino of the First Office Action (for a related patent application), (Dec. 5, 2012).

*Primary Examiner* — Eric Keasel
(74) *Attorney, Agent, or Firm* — Laurence P. Colton; Smith Risley Tempel Santos LLC

(57) ABSTRACT

A glue valve with electromagnetic actuation of a valve tappet (15) having a valve housing (10), which has a lateral aperture which is open in the upward direction, that is to say a side opening (36). A coil core (13) and a transversely directed carrying crosspiece (26), on which a plug (22) can be fitted, form a unit, that is to say a coil unit (21), which can be introduced into the valve housing (11) in one operation, via the side opening (36) which is open in the upward direction.

14 Claims, 3 Drawing Sheets

(56) References Cited

U.S. PATENT DOCUMENTS

| | | | |
|---|---|---|---|
| 6,257,445 B1 * | 7/2001 | Means et al. | 222/504 |
| 6,457,484 B1 * | 10/2002 | Najmolhoda | 251/129.15 |
| 6,460,731 B2 * | 10/2002 | Estelle et al. | 222/146.5 |
| 6,761,290 B2 * | 7/2004 | Righolt et al. | 222/504 |
| 6,994,234 B2 * | 2/2006 | de Leeuw | 222/504 |
| 7,341,169 B2 | 3/2008 | Bayer | |
| 2006/0219740 A1 | 10/2006 | Bayer | |

FOREIGN PATENT DOCUMENTS

| | | |
|---|---|---|
| DE | 20218441 U1 | 2/2003 |
| DE | 102007029064 A1 | 12/2008 |

\* cited by examiner

US 8,991,784 B2

VALVE, PARTICULARLY GLUE VALVE

STATEMENT OF RELATED APPLICATIONS

This application is the Patent Cooperation Treaty (PCT) Chapter II National Phase of and claims the benefit of International Application No. PCT/EP2011/002253 having an International Filing Date of 13 Apr. 2010, which claims priority on German Patent Application No. 10 2009 022 496.3 having a filing date of 25 May 2009.

BACKGROUND OF THE INVENTION

1. Technical Field

The invention relates to a valve for free-flowing media, particularly a glue valve (glue nozzle), having a valve tappet which can be moved by an electromagnet in a valve housing and butts against a valve seat, by way of a closure component, in the closed position, wherein a coil on a coil body, the coil being supplied with power via an electrical connection or electric plug, (partially) encloses the valve tappet.

2. Prior Art

Such a valve is illustrated and described in WO 2008/155117. A special feature of this known (glue) valve is that the closure element or the valve tappet is forced into the closed position by permanent magnets arranged within the valve housing. The electromagnet serves for moving the valve tappet into the open position counter to the closing force of the permanent magnets.

BRIEF SUMMARY OF THE INVENTION

It is an object of the invention to develop further a valve, particularly a glue valve, of the configuration described in the Technical Field so as to ensure a contact construction, efficient operation and straightforward assembly.

In order to achieve this object, the valve according to the invention is characterized by the following features:
a) the valve housing is open on at least one side, at least over part of the height or part of the length, to form a side opening which is open in the upward direction,
b) at least one valve connection, in particular the plug, is fitted on a separate (connection) carrier and positioned alongside the valve housing, and
c) the (connection) carrier can be introduced into the valve housing via the open end of the side opening and passes out of the valve housing in the sideways direction via the side opening.

One special feature is constituted by the unit which is formed from the coil, coil core and plug, is prefabricated separately and, on account of the open side opening which continues along one side, can be introduced (from above) into the valve housing such that the coil body and coil are located within the housing or the housing chamber and the plug, which is connected in one piece to the coil body, is located laterally alongside the valve housing.

A further special feature is constituted by the design of the valve tappet, in particular in conjunction with an adjoining bolt-like closure element of the housing in extension of the valve tappet. The latter is provided with cross-sectional profiling to form longitudinally running grooves, in particular, in the case of a hexagonal design. The axially adjoining bolts or a permanent magnet is designed correspondingly, that is to say likewise with longitudinally running grooves.

BRIEF DESCRIPTION OF THE DRAWINGS

An exemplary embodiment of the valve is illustrated in the drawings, in which.

DETAILED DESCRIPTION OF PREFERRED EMBODIMENTS

Figure 1:
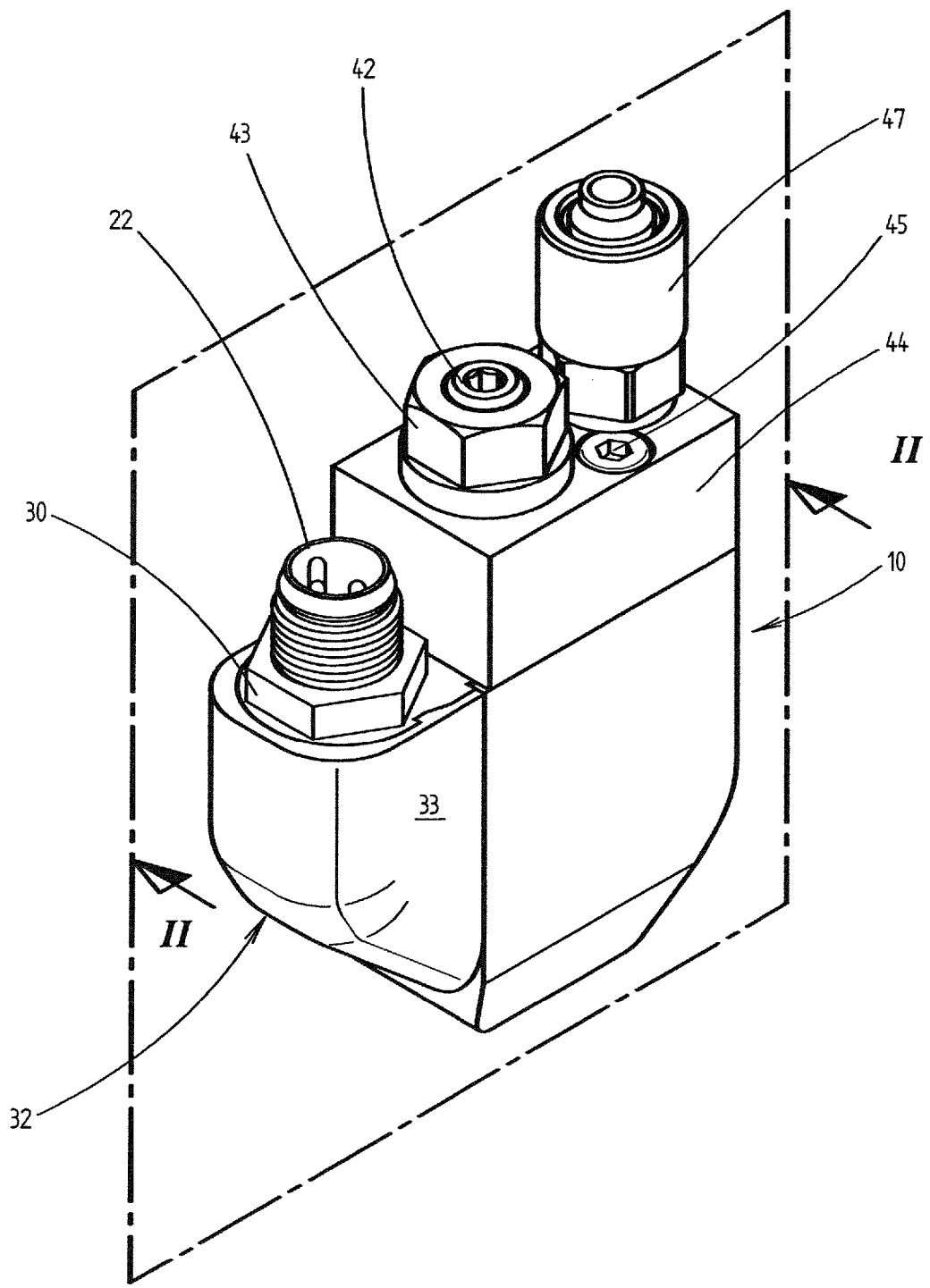
FIG. 1 shows a perspective illustration of a valve, particularly a glue valve.
Figure 2:
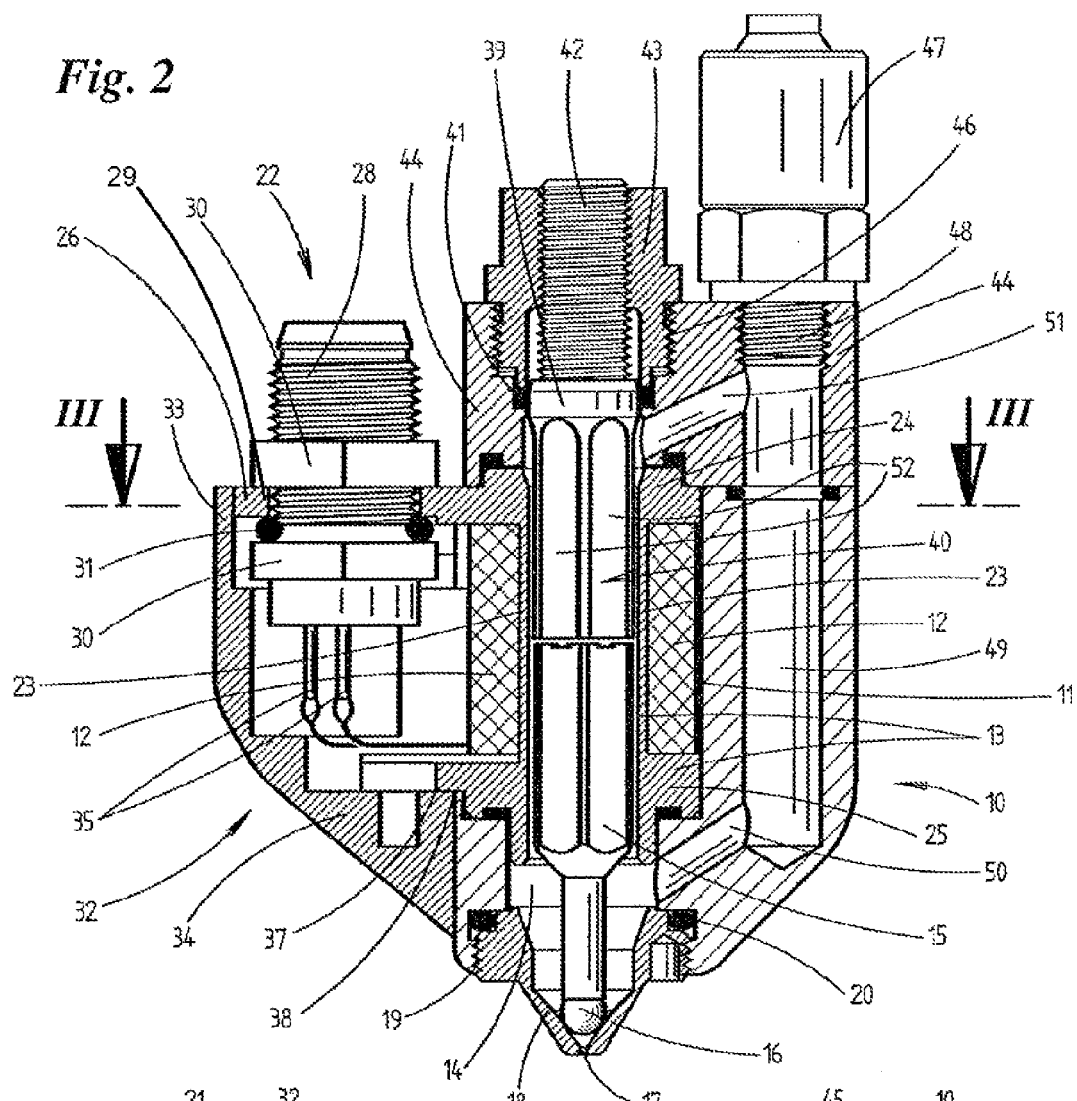
FIG. 2 shows the glue valve according to FIG. 1 in a vertical section taken along section plane II-II from FIG. 1.

The valve shown can be used preferably as a glue valve for transferring comparatively small portions of glue onto folding flaps of packs, in particular cigarette packs. The glue valve is designed for high cycle times.

The functional parts of the glue valve are arranged in a basic body, valve block or valve housing 10 and are attached to this valve housing 10. The valve is actuated electromagnetically. An electromagnet, comprising a coil 12 and a coil carrier or coil core 13, is arranged within the valve housing 10, that is to say in an in this case round or (partially) cylindrical housing interior 11.

The coil core 13, which is designed here in the form of a molding, forms a central, cylindrical carrying component, which is part of a valve chamber 14. A closure element or metering element of the valve, referred to hereinbelow, as valve tappet 15, is arranged in a movable manner within the central opening of the coil core 13 or in the valve chamber 14. This valve tappet is provided with a guide part, which is located within the coil core 13, and at the bottom with a stem of smaller cross section. A ball 16 is fitted thereon as a closure means for a nozzle opening 17. The ball 16 consists, in particular, of ceramic material. The valve opening 17 is provided centrally in the region of a funnel-like valve seat 18. The ball 16 butts against conical seat surfaces in the closed position. The valve seat 18 is a separate molding, which is inserted into the valve housing 10 in a releasable manner via an internal thread 19. The necessary sealing is achieved by means of an O-ring 20.

The valve comprises a plurality of components which are put together by form-fitting interengagement. In the case of the present exemplary embodiment, two main components are connected to one another to form the valve, that is to say, on the one hand, the block-like valve housing 10 (made of metal) and, on the other hand, a coil unit 21 with coil core 13, coil 12 and also an electrical connection or plug 22. The coil core 13 comprises a cylindrical inner part or core casing 23 as the carrier of the coil 12. Transversely directed, circular rings 24, 25 are fitted to, or formed in one piece at, free ends (at the top and bottom). The coil 12 is mounted between the rings 24, 25. The unit made up of the coil 12 and coil core 13 is seated in the essentially cylindrical housing interior 11.

The plug 22, as a connection for the power supply and control of the valve, is a separate component, which is connected to the coil core 13 to form a unit, that is to say to form the coil unit 21. The upper ring 24, which is remote from the valve seat 18, is provided with a carrying part for the plug 22, this carrying part projecting laterally out of the valve housing 10 or the valve body and, in other words, being a transversely directed carrying crosspiece 26. The latter is preferably part of the coil core 13 or of the ring 24, that is to say is connected in one piece thereto. The transversely directed carrying crosspiece 26 has a (circular) aperture 27. The plug 22 is arranged therein, to be precise by way of a connection component 28 with external thread. The connection component 28 has the connecting parts for an electrical connection which are illustrated in FIG. 1. A supporting flange 29 is formed within and/or beneath the carrying crosspiece 26, and this flange, in conjunction with an outer locking screw 30, fixes the plug 22 with clamping action to the carrying crosspiece 26, to be precise in conjunction with an annular seal 31.

The carrying crosspiece 26 is part of a plug housing 32. The latter consists preferably of plastics material and is adapted to the contour of the valve, that is to say it comprises a cross-sectionally U-shaped side wall 33 and a base wall 34, which leads obliquely in the direction of the valve seat 18. The carrying crosspiece 26 forms the upper covering of the plug housing 32. The latter is connected to the carrying crosspiece 26 in a form-fitting manner by way of protrusions and depressions latching one inside the other (FIG. 3) and/or by adhesive bonding. The plug housing 32 fits closely against the contour of the valve housing 10 and is connected to the valve housing 10 by adhesive bonding in the region of abutment surfaces.

The plug housing 32 contains elements of the plug 22, in particular electric lines 35, which lead via the open side of the plug housing 32 to the coil 12, in this case to the lower region thereof.

It is also the case that the valve housing 10 or the valve body is designed in a particular way. The predominantly cylindrical housing interior 11 is open at least in a sub-region, that is to say in the direction of the side of the plug 22, to form a side opening 36 of the valve housing 10. The side opening 36 extends at least in the region of the carrying crosspiece 26 for the plug 22, in which case this connecting element passes laterally out of the valve housing 10 in order to grip the plug 22 (or some other element).

Figure 4:
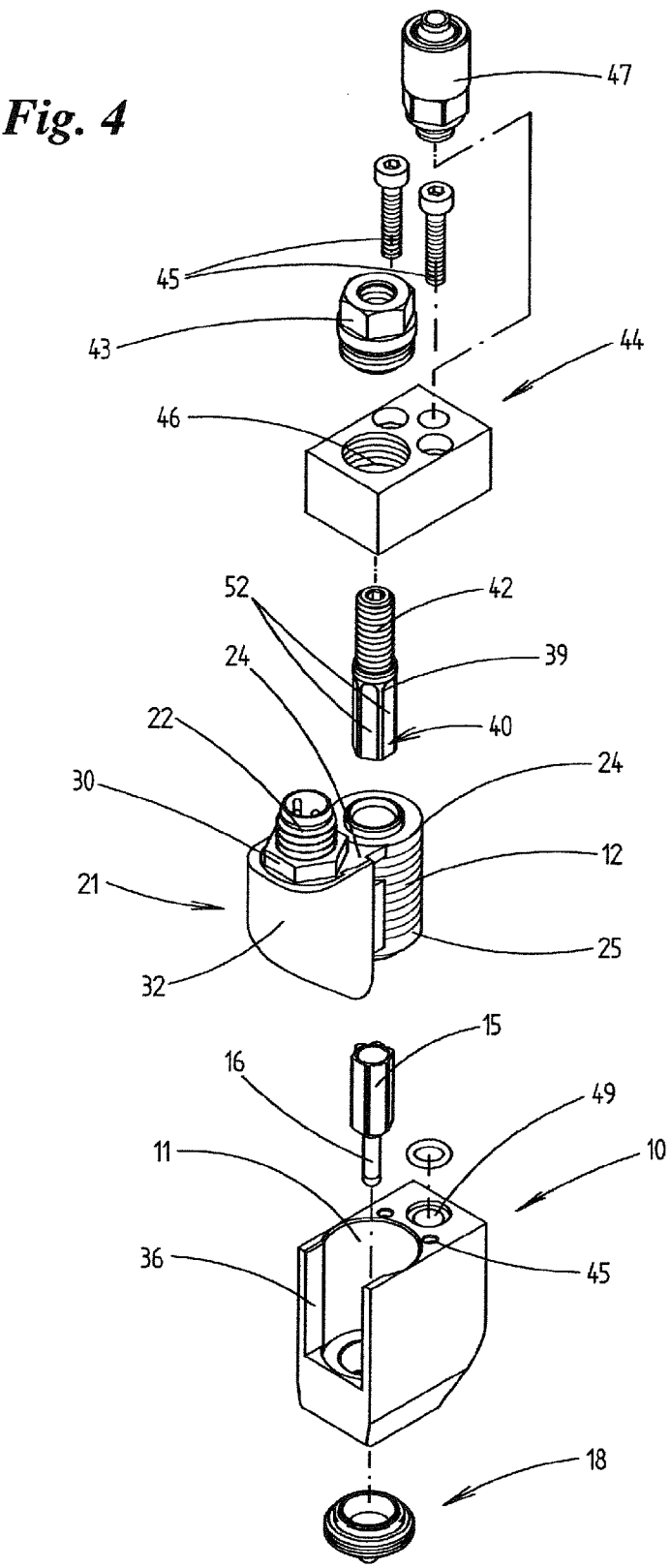
FIG. 4 shows the glue valve with the individual parts in the form of an exploded drawing.

In the present case, the valve housing 10 is open approximately over the entire length and/or height of the coil unit 21 or of the coil core 13 (bottom of FIG. 4). It is thus possible for a protrusion 37, which is fitted laterally in the region of the (lower) ring 25 of the coil core 13, to pass into the region of the plug housing 32, to be precise with abutment against a mating protrusion 38 of the plug housing 32. Accordingly, the two elements 37, 38 form corresponding supporting and/or adjusting elements for correct relative positioning between the coil core 13 and the plug housing 32.

Figure 3:
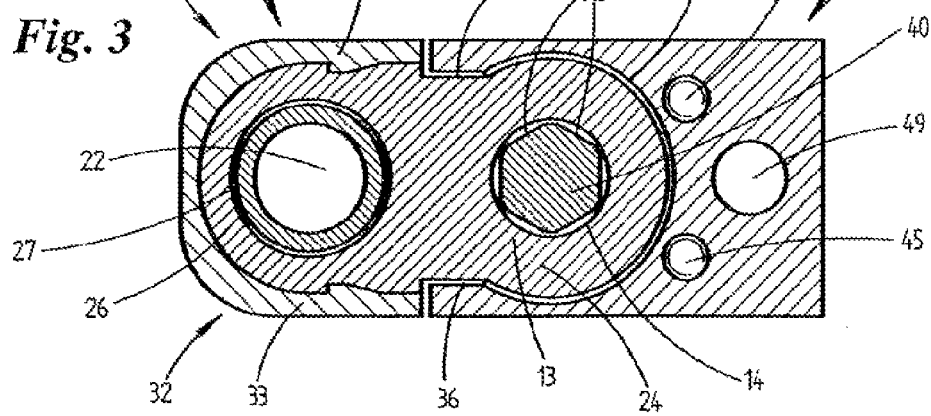
FIG. 3 shows the glue valve in a horizontal section taken along section plane III-III from FIG. 2.

It is an important feature of the valve that the side opening 36 is open in the upward direction (on the side located opposite the valve seat 18), to be precise for assembly purposes. The coil unit 21 can thus be introduced into the valve housing 10 via the open side, wherein the coil 12 with the coil core 13 fills the housing interior 11 in an essentially form-fitting manner (FIG. 3). Parts of the coil unit 21 pass into the side opening 36 and/or through the same. The latter applies, in the present case, to the carrying crosspiece 26 and, opposite this, to the protrusion 37. These parts are dimensioned such that they fill the cross section of the side opening 36 (FIG. 3). The dimensioning of the side opening 36 is selected such that the coil unit 21 or the coil core 13 is surrounded in a region of more than 180°. The coil unit 21 thus sits in a form-fitting manner in the housing interior.

The valve chamber 14 is closed off on the side located opposite the valve seat 18 (that is to say the upper side), by an adjustable closure, that is to say by a cylindrical head 39, which fits into the valve chamber 14 via the free end. The bolt-like head 39 is, at the same time, a carrier for a permanent magnet 40, which interacts with a mating magnet on the adjacent side of the valve tappet 15. The head 39 forms, with an O-ring, a sealing means or seal 41 of the valve interior in relation to the outside.

The head 39 can be adjusted in the longitudinal direction of the valve chamber 14. For this purpose, an extension of the head 39 is designed as a threaded bolt 42. The latter can be adjusted in a fixed internally threaded carrier 43 connected (indirectly) to the valve housing 10. The free end of the threaded bolt 42 has an aperture for the attachment of a tool, for example a socket-head-screw wrench.

The feeding of the medium which is to be processed, that is to say, in particular, the glue feed, also constitutes a special feature. For this purpose, a glue connection 47 for a glue line is fitted on the upper side—on the side located opposite the valve seat 18. This glue connection is located in the region of the valve housing 10 or of the valve body, in the present case on the side located opposite the plug 22, preferably in a common center plane of the head 39 and the plug 22. The glue connection 47 is thread-fixed in a bore 48 of the cover 44. This is adjoined—with a sealing ring—by a glue channel 49, which extends essentially axis-parallel to the valve chamber 14. In a (lower) region, adjacent to the valve seat 18, the glue channel 49 is connected to the valve chamber 14 via an obliquely directed connection channel 50, to be precise in a region directly above the valve seat 18. The lines for the glue thus bypass the coil core 13 and open out in the region of a reduced cross section of the valve tappet 15, beneath the coil core 13.

The valve is expediently assembled such that the coil unit 21 (with plug(22)) is inserted into the housing interior 11 via the open side. Thereafter, the magnet unit is introduced into the opening of the coil core 13, that is to say into the valve chamber 14. The cover 44 is then positioned on the valve housing 10 and connected thereto. This is followed by fixing of the carrier 43, that is to say by connection, on the one hand, to the cover 44 and, on the other hand, to the threaded bolt 42. The glue connection 48 is then fastened on the cover 44.

The valve tappet 15 can be introduced into the valve chamber 14 from the opposite (lower) side before the valve seat 18 is moved into the position by means of the thread. As an alternative, it is also possible for the valve tappet 15 to be introduced from the opposite side, that is to say prior to the closure 39, 40 being introduced into the valve chamber.

The unit which in this case comprises the permanent magnet 40, head 39 and threaded bolt 42 serves as an adjustable lift stop for the valve tappet 15. The unit as a whole is easily interchangeable. For this purpose, all that is required is for the carrier 43, which is designed as a screw, to be removed by means of being rotated. This allows those parts which are subjected to loading and wear to be exchanged in a straightforward manner. Undesired rotary movements of the unit 40, 39, 42 are prevented by a small thread pitch and by the annular seal 41.

The permanent magnet 40, which is designed in the form of a closure bolt, and the valve tappet 15, which follows in the downward direction or in the direction of the valve opening 17, are designed with a particular profile, that is to say such that grooves 52 run in the longitudinal direction of the closure bolt or of the permanent magnet 40. These grooves extend into the region of the cylindrical head 39. The permanent magnet 40 is preferably hexagonal in cross section (FIG. 3), thus forming corresponding grooves 52 in relation to the cylindrical wall of the valve chamber 14. The valve tappet 15 is designed in a corresponding or analogous manner in the region of the cylindrical part of the valve chamber 14. Glue can flow in the longitudinal direction through the grooves.

The grooves 52 are of particular importance in conjunction with the operation of feeding the glue. The glue channel 49, which runs parallel to the valve chamber 14 and has a (first) connection channel 50 in the region of the widened valve chamber 14, is provided for this purpose. At least one further glue channel, that is to say an additional channel 51, extends between the glue channel 49 and the valve chamber 14. The additional channel 51 opens out in the region of the permanent magnet 40, to be precise in the region of the grooves 52 on the circumference of this valve part. In order for glue to be fed to better effect, it is also possible for the housing, that is to say the cover 44 and possibly the ring 24, to be provided with an all-round widening, in which case the valve interior has a greater cross section in this region.

Different amounts of glue can be fed via the glue channels 50, 51. In particular, the quantity of glue passing into the valve via the additional channel 51 is smaller, e.g. 40%, than that which passes in via the connection channel 50.

List of Designations

- 10 Valve housing
- 11 Housing interior
- 12 Coil
- 13 Coil core
- 14 Valve chamber
- 15 Valve tappet
- 16 Ball
- 17 Valve opening
- 18 Valve seat
- 19 Internal thread
- 20 O-ring
- 21 Coil unit
- 22 Plug
- 23 Core casing
- 24 Ring
- 25 Ring
- 26 Carrying crosspiece
- 27 Aperture
- 28 Connection component
- 29 Supporting flange
- 30 Locking screw
- 31 Annular seal
- 32 Plug housing
- 33 Side wall
- 34 Base wall
- 35 Line
- 36 Side opening
- 37 Protrusion
- 38 Mating protrusion
- 39 Head
- 40 Permanent magnet
- 41 Seal
- 42 Threaded bolt
- 43 Carrier
- 44 Cover
- 45 Headed screw
- 46 Aperture
- 47 Glue connection
- 48 Bore
- 49 Glue channel
- 50 Connection channel
- 51 Additional channel
- 52 Groove

What is claimed is:

1. A valve for free-flowing media, comprising:
   a valve housing (10);
   a valve tappet (15);
   a valve seat (18);
   a closure component;
   an electromagnet comprising a coil (12) and a coil core (13), the coil (12) is located on the coil core (13);
   a connection carrier (26); and
   at least one valve connection is fitted on the separate connection carrier (26) and positioned alongside the valve housing (10),
   wherein
   the valve tappet (15) is movable between an open and a closed position by the electromagnet in the valve housing (10) so as to butt against the valve seat (18), by way of the closure component, in the closed position;
   the coil (12) at least partially encloses the valve tappet (15);
   the valve housing (10) comprises a top and at least one side having a height or length; the valve housing (10) is open on the at least one side, at least over part of the height or part of the length, to form a side opening (36) in the at least one side, such that the housing interior (11) is open in the region of the side opening (36); and the valve housing (10) has a cross-sectionally circular housing interior (11), in which the coil core (13) is fitted, the coil core (13) having a circular cross-section corresponding to the valve housing (10) and a circumference;
   the side opening (36) is open on the top of the valve housing (10) which is opposite the valve seat (18), and the side opening (36) extends approximately over a length or height of the coil core (13), wherein part of the circumference of the coil core (13) extends into the side opening (36);
   the at least one valve connection is an electrical connection and the coil is supplied with power via the electrical connection;
   the connection carrier (26) is introduced into the valve housing (10) via the side opening (36); and
   the coil core (13) is subjected to the action of the cover (44) in the region of the upper ring (24) such that the lower ring (25) is pushed against protrusions in the valve housing (10) or in the housing interior (11).

2. The valve as claimed in claim 1, further comprising:
   a valve chamber (14);
   a glue connection (47); and
   an upper closure component or carrying component by means of which the coil core (13) is fixed in the valve housing (10) and which serves as a carrier for an adjustable termination of the valve chamber (14).

3. The valve as claimed in claim 2, further comprising an upper closure element for the valve chamber (14) or for a head (39) at the top of the valve chamber (14) and a retaining element, wherein, for the purpose of adjustably arranging the upper closure element, the cover (44) has fitted on it a carrier (43) as the retaining element, which is arranged in a releasable manner in an aperture in the cover (44), and wherein the closure element of the valve chamber (14) or the head (39) is mounted by way of a threaded bolt (42) in an internally threaded through-passage of the carrier (43).

4. The valve as claimed in claim 2, wherein the cover (44) further comprises a passage for a glue-feed connection, wherein the glue connection (47) in the valve housing (10) leads to a glue channel (49), which runs outside the region of the housing interior (11) into a region adjacent to the valve seat (18) and opens out in the valve seat (18) via a connection channel (50) in the valve chamber (14).

5. The valve as claimed in claim 1, wherein the connection carrier (26) is separate from the valve housing (10).

6. The valve as claimed in claim 1, wherein the connection carrier (26) is a transversely directed carrying crosspiece (26), wherein
   the electrical connection is fitted on the transversely directed carrying crosspiece (26); and
   the transversely directed carrying crosspiece (26) is anchored in the valve housing (10) by being connected in one piece to the coil core (13).

7. The valve as claimed in claim 6, wherein the coil core (13) comprises an inner, cylindrical core casing (23) and transversely directed upper flange or ring (24) and lower flange or ring (25) at both ends of the core casing (23), and wherein the carrying crosspiece (26) is connected in one piece to the upper ring (24).

8. The valve as claimed in claim 6, wherein the electrical connection comprises a plug (22) arranged in a separate plug housing (32) comprising a U-shaped side wall (33) and a base wall (34), the plug housing (32) being attached laterally to the valve housing (10) in the region of the side opening (36) and is open in the direction of the valve housing (10).

9. The valve as claimed in claim 8, wherein the carrying crosspiece (26), as carrier for the plug (22), forms an upper covering of the plug housing (32), and wherein electric lines (35) within the plug housing (32) lead from the plug (22) to the coil (12).

10. The valve as claimed in claim 1, further comprising:
- a glue channel (49);
- a connection channel (50) leading from the glue channel (49), and which opens out in the region of the valve chamber (14); and
- an additional channel (51),
- wherein the glue channel (49) is connected by way of the additional channel (51) to the housing interior (11), adjacent to a closing-off element of the housing interior (11), the closing-off element being located opposite the valve seat (18).

11. The valve as claimed in claim 10, wherein the closing-off element of the cylindrical housing interior (11) comprises a threaded bolt (42), which has a permanent magnet (40) in a region directed toward the valve tappet (15), wherein the permanent magnet (40), or a sheathing enclosing the permanent magnet (40), has a cross-sectional profile with longitudinally running outer grooves (52), and wherein the grooves (52) are arranged such that glue passes into the housing interior (11) via the additional channel (51).

12. The valve as claimed in claim 11, wherein the grooves (52), which run on an outer lateral surface of the permanent magnet (40) or of the sheathing, are connected to the additional channel (51) for the glue supply such that an amount of glue passes into the housing interior (11) via the additional channel (51) and the grooves (52).

13. The valve as claimed in claim 11, further comprising an upper closure element for the valve chamber (14) or for a cylindrical head (39) at the top of the valve chamber (14), wherein the additional channel (51) opens out in the region of the grooves (52) and of the closure element and beneath the cylindrical head (39) in the housing interior (11) such that glue can be fed in the region of the closure element via the additional channel (51) and passed into the housing interior (11) through the grooves (52) on the permanent magnet (40).

14. The valve as claimed in claim 11, 12, or 13, wherein the valve tappet (15) is provided with longitudinally running grooves (52).

* * * * *